Sept. 16, 1924.
F. C. WEBER ET AL
1,508,833
REFRIGERATING APPARATUS
Original Filed May 29, 1919    2 Sheets-Sheet 1
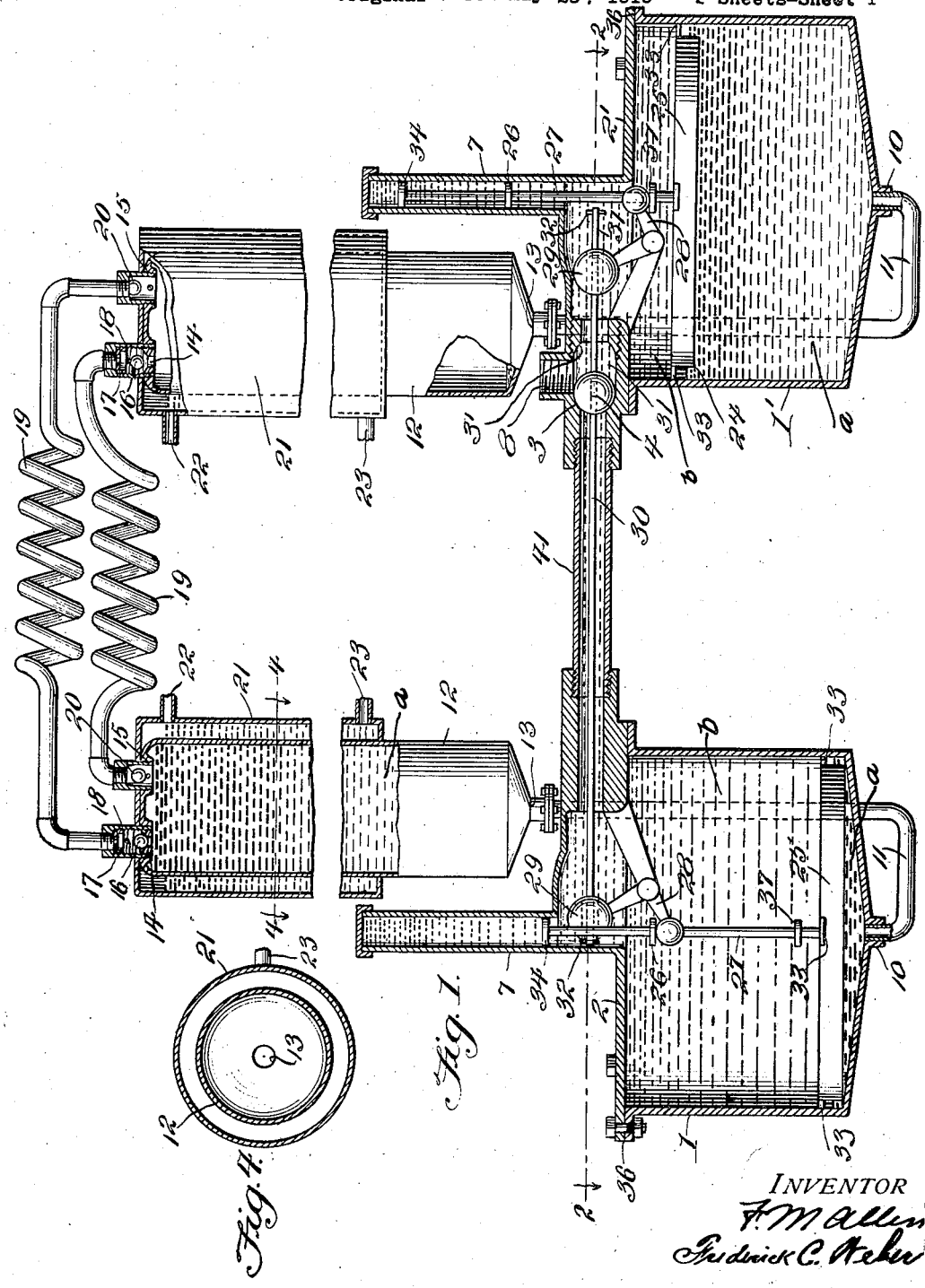
INVENTOR
F. M. Allen
Fredrick C. Weber

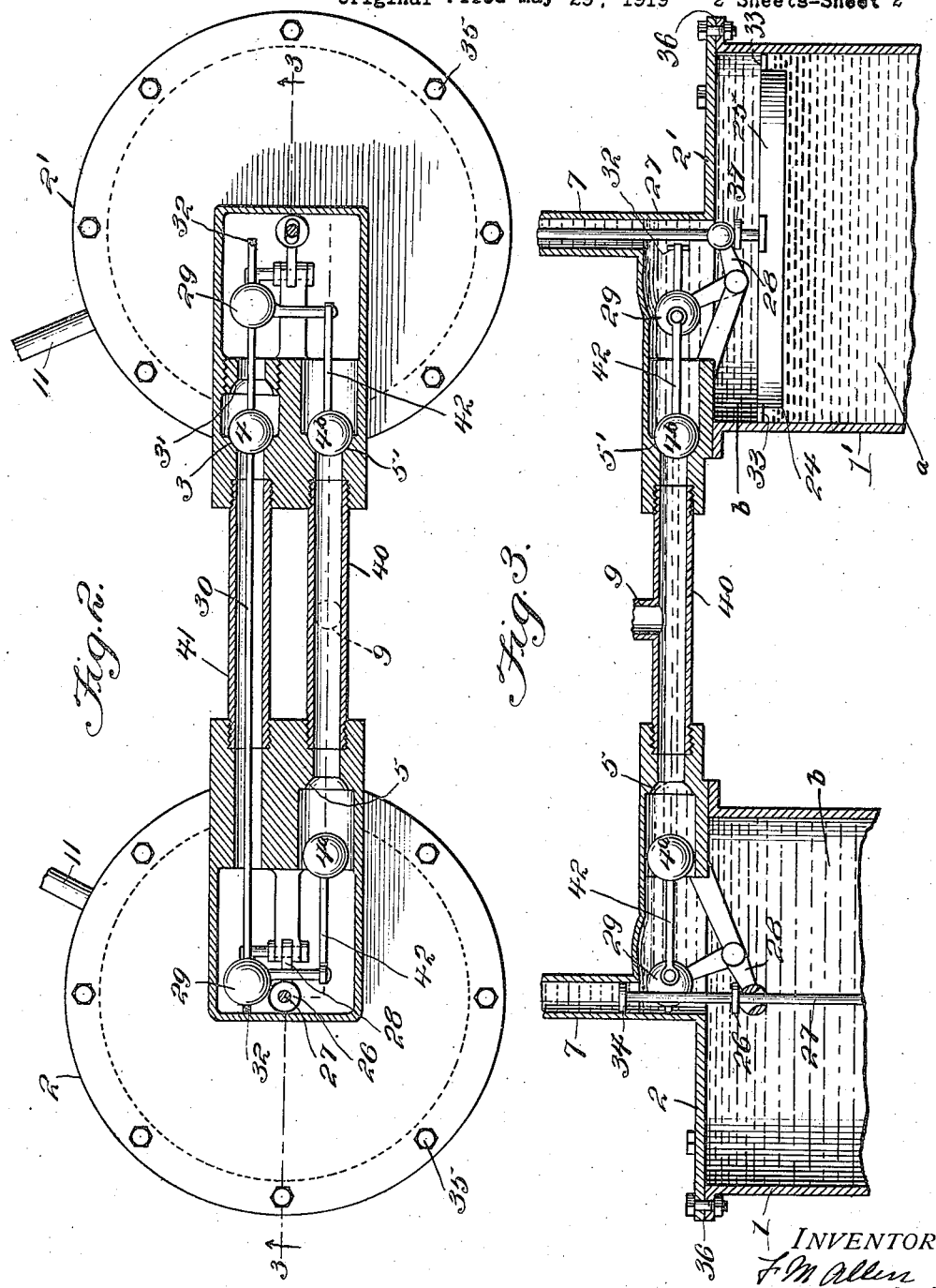

Patented Sept. 16, 1924.

1,508,833

UNITED STATES PATENT OFFICE.

FREDERICK C. WEBER, OF NEW YORK, N. Y., AND FRANK M. ALLEN, OF WASHINGTON, DISTRICT OF COLUMBIA.

REFRIGERATING APPARATUS.

Application filed May 29, 1919, Serial No. 300,613. Renewed February 18, 1924.

*To all whom it may concern:*

Be it known that we, FREDERICK C. WEBER and FRANK M. ALLEN, citizens of the United States, and residents, respectively, of New York, in the county of New York and State of New York, and of Washington, in the District of Columbia, have invented new and useful Improvements in Refrigerating Apparatus, of which the following is a specification.

The object we have in view is the production of a refrigerating device suitable for domestic purposes, and which may be attached to the ordinary household refrigerator. Further it is our object to produce an apparatus which will be simple and practicable, safe, easy of operation, and which will require no expert care or attention. Other features which are embodied in the apparatus are cheapness of construction, compactness, simplicity, automatic action, absence of complicated and highly machined parts, and minimum cost of operation.

These objects are attained by the embodiment illustrated in the accompanying drawings, in which,—

Fig. 1 is a longitudinal section with parts in elevation;

Fig. 2 is a sectional view on the line 2—2 of Fig. 1, looking in the direction of the arrows, with some parts in the plane of section shown in elevation;

Fig. 3 is a sectional view on line 3—3 of Fig. 2, looking in the direction of the arrows and Fig. 4 is a cross-section on the line 4—4 of Fig. 1.

As a means of realizing the invention there is provided a system consisting of two units, mechanically similar and alternately automatically operated with a liquid piston and water power or other liquid power. The units comprise, respectively, reservoirs 1 and 1', of sufficient capacity, having tops 2, 2'. The top 2', in this instance, contains intake valves seats 3 and 3' spaced for alternate engagement by a ball valve member 4. The respective tops also contain discharge valve seats 5 and 5', which are closed alternately by ball valve members 4ª, 4ᵇ. Projecting vertically from each top 2, 2' is an extension 7. Between the valve seats 3, 3' is an inlet 8, and between the seats 5, 5' an outlet 9, capable of receiving standard pipe fittings. The outlet 9 is shown connected with a pipe 40 extending between the two reservoir tops between the outlet valves; and another pipe 41 is shown connecting the top 2 of reservoir 1 with its inlet valve seat 3.

At the bottom of each reservoir is an opening 10 for a communicating pipe 11, which extends upward to an operating cylinder 12, there being one of these cylinders for each of the reservoirs. Each cylinder 12 is of required capacity and has at its lowest portion an opening 13 to receive the corresponding communicating pipe 11. At the top of each cylinder 12 are an outlet 14 and an inlet 15. The outlets 14 lead through check valves 16 to expansion plates 17, through which are restricted apertures 18. The size of the apertures 18 is such as to regulate the pressure in cylinders 12 and the rate of discharge into expansion coils 19. Each of these coils leads from the top outlet of one cylinder to the top inlet 15 of the other cylinder, the said inlets being guarded by check valves 20.

The operating cylinders 12 are surrounded by water-jackets 21, which have inlets 22 near the top and outlets 23 near the bottom. These water-jackets cover approximately the upper two-thirds of the cylinders. The cylinders 12 are adjacent to their reservoirs 1 and somewhat elevated, the bottom of the cylinder being at or above the normal level of the fluid piston in the reservoir.

The expansion coils 19 are connected to the two units by ground unions, in such manner as to facilitate the removal or adjustment of the expansion plates 17 at the juncture of the unions. The expansion coils may be placed within the refrigerator cooling chamber and may be arranged at any place convenient to the rest of the apparatus. In practice, the coils should be so arranged as to drain completely into the cylinders 12.

The actuating power is obtained by means of water under pressure or other fluid under pressure, delivered to the apparatus through inlet 8 past the alternating inlet valve mechanism 3, 3', 4. Compression of the refrigerant is obtained by means of water under pressure, or other fluid under pressure acting through a fluid piston or liquid separator *a*, interposed between the refrigerating material and the actuating power. In the illustrated embodiment we prefer to employ mercury as a piston and separator, but with some modification other liquids may be employed.

In the action to be described the fluid piston also serves as the liquid separator between the actuating power and the refrigerant, preventing the solution of the refrigerant in the water or other actuating fluid, which if permitted would deplete the system of the refrigerant.

It is obvious that the fluid piston or other liquid separator must have certain physical and chemical properties which will enable it to be successfully employed with any of the various refrigerating materials commonly used.

The present specification refers more particularly to an apparatus designed for a fluid piston, or liquid separator, heavier than water. It is not our intention to limit the expression of the invention to an apparatus of this type, since forms can be designed to operate with fluid pistons, or separators, having proper chemical and physical properties and being lighter than water.

In the apparatus as illustrated in the accompanying drawings, the reservoirs 1, 1' are charged with the fluid pistons, and above the fluid pistons in the reservoirs are bodies of the actuating liquid $b$. The normal level of the fluid piston is indicated at 24. One of the cylinders 12 is then charged with the refrigerant. The charging is made possible by exhaustion of the space in cylinders 12, or in any suitable manner. When the fluid power valve (not shown) in the pipe leading to inlet 8, is opened, the water under pressure is delivered into one of the reservoirs above the fluid piston. If the valve mechanism be in the position shown in the drawings, it will be delivered into reservoir 1', and will displace the fluid piston therein through opening 10 and pipe 11 into the corresponding operating cylinder 12. The refrigerant in this cylinder is compressed to a point bordering on liquefaction, or actually liquefied, depending upon the temperature of the cooling water and upon the pressure, and is forced past check valve 16 to expansion plate 17 and through aperture 18 at the required pressure and volume, and is expanded in expansion coil 19, whence it passes through check valve 20 into the operating cylinder 12 of the other unit. The reservoir 1, in the condition shown, is practically entirely filled with water, the mercury of its fluid piston filling the corresponding cylinder 12. The outlet valve 4ª of this reservoir having been opened, the mercury flows back into reservoir 1 and the water is forced out at the discharge opening 9, thus producing a vacuum in the left-hand cylinder 12, and permitting the refrigerating fluid to come over from the right-hand cylinder, as stated. When the fluid piston has been displaced from reservoir 1', and an iron float 25 riding thereon has been lowered until projection 26 on float rod 27 strikes the end of bell-crank 28, the further displacement of the fluid piston and consequent lowering of float 25 will turn the bell-crank to the center of gravity. Counterweight 29 will then pass the center, and by action of gravity will close intake valve 3' and open discharge valve 5'. The removal of the pressure and the opening of discharge valve 5' will allow the fluid piston to return to its normal position or level, discharging the power fluid through valve 5' and opening 9. The fluid piston returning to normal level will cause vacuum to be formed in the operating cylinder 12 connected with reservoir 1'. The lowering of the float 25 in the reservoir 1', through the action of the counterweight 29, also opens the inlet valve 3 and closes the outlet valve 5 of the reservoir 1. These operations alternate. Rod 30 is solidly attached to ball 4 of the intake valves and has an extension 31 beyond the end of ball 4 where it passes loosely through counterweight 29. At and near the ends of extension 31, beyond the counterweights 29, are abutments 32. The outlet valve members 4ª, 4ᵇ are connected with the bell-cranks by links 42. When the floats rise the counterweights are restored to the positions from which they operate on the descent. This is accomplished by collars 37. The floats 25 are guided by loosely-fitting projections 33 against the sides of the reservoirs and by loosely fitting disks 34 at the top of the rods 27 in the projections 7. We do not, however, limit ourselves to the precise mechanism.

What we claim as new is:

1. A refrigerating apparatus having, in combination with means for cooling the compressed refrigerant and means for expanding the same to secure the refrigerating effect, means for compressing the refrigerant actuated by liquid pressure and having a liquid piston between the power liquid and the refrigerant.

2. A refrigerating apparatus comprising two compressing and cooling parts actuated by liquid pressure and having liquid pistons between the power liquid and the refrigerant, expansion means connected between the two parts, and means whereby the power liquid under pressure is caused to act alternately in the two parts.

3. A refrigerating apparatus comprising two compressing and cooling parts actuated by liquid pressure and having liquid pistons between the power liquid and the refrigerant, each of said parts having means affording a restricted aperture through which the refrigerant is expanded, and a return passage guarded by a check valve, refrigerating coil means connected between the restricted apertures and return passages of the two parts, and means whereby the power liquid under pressure is caused to act alternately in the two parts.

4. A refrigerating apparatus comprising a pair of reservoirs, a pair of cylinders connected with the reservoirs, liquid pistons adapted to pass back and forth between the reservoirs and cylinders, means for admitting power fluid under pressure alternately to and permitting it to escape alternately from the reservoirs, means for cooling the cylinders, and expansion means connected between the cylinders.

FRANK M. ALLEN.
FREDERICK C. WEBER.